Figure 2:
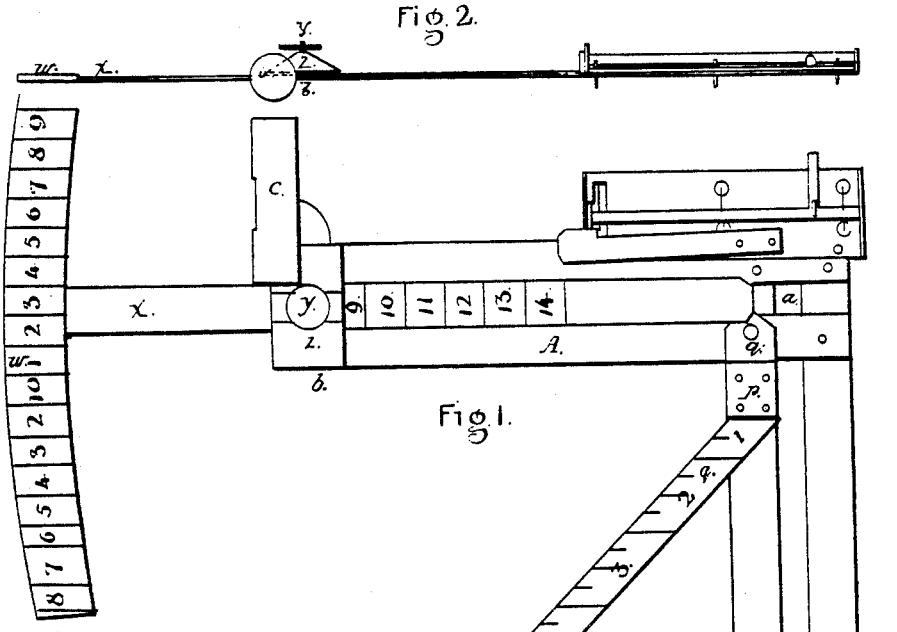
Figure 1:
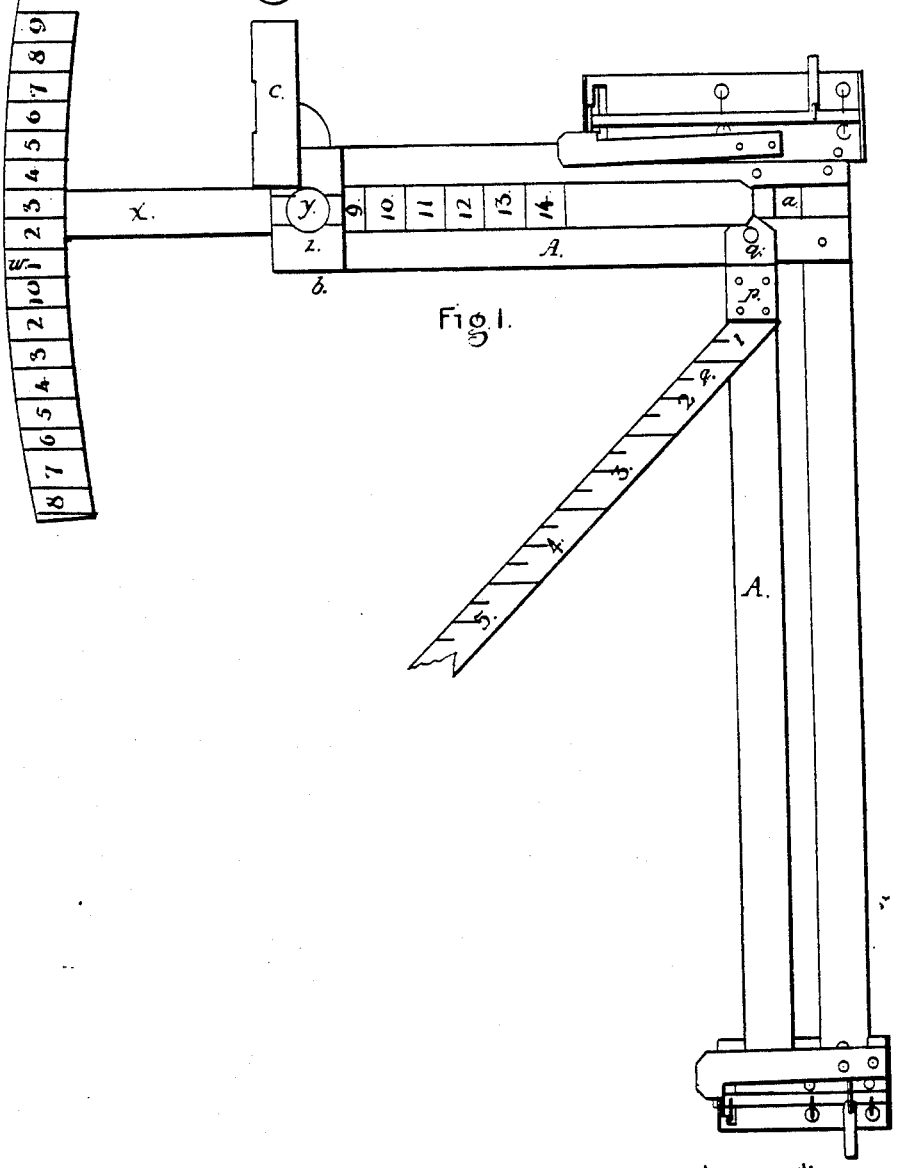

D. Williams.

BEST AVAILABLE COPY

Tailor's Measure.

No. 31. A. I. Patented Feb. 18, 1840.

Witnesses:
Wm Strachan
W Connelly

Inventor:
Daniel Williams

N. PETERS, PHOTO-LITHOGRAPHER, WASHINGTON, D. C.